(12) United States Patent
Jure et al.

(10) Patent No.: US 8,135,802 B2
(45) Date of Patent: Mar. 13, 2012

(54) MULTI-SUPPLIER, MULTI-DOMAIN MEDIATING ELEMENT FOR EVENT NOTIFICATION

(75) Inventors: Patrick Jure, Louannec (FR); Gaêl Fromentoux, Pleumeur-Bodou (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/547,165

(22) PCT Filed: Feb. 26, 2004

(86) PCT No.: PCT/FR2004/000434
§ 371 (c)(1),
(2), (4) Date: Aug. 25, 2005

(87) PCT Pub. No.: WO2004/080028
PCT Pub. Date: Sep. 16, 2004

(65) Prior Publication Data
US 2006/0200544 A1 Sep. 7, 2006

(30) Foreign Application Priority Data
Feb. 28, 2003 (FR) .................................. 03 02469

(51) Int. Cl.
*G06F 17/00* (2006.01)
(52) U.S. Cl. ..................... 709/219; 709/220; 709/204
(58) Field of Classification Search .................. 709/219; 705/1; 455/456.1
See application file for complete search history.

(56) References Cited

U.S. PATENT DOCUMENTS

| | | | | |
|---|---|---|---|---|
| 6,070,083 A * | 5/2000 | Watters et al. | ................. | 455/517 |
| 6,230,018 B1 * | 5/2001 | Watters et al. | ............. | 455/456.3 |
| 6,347,228 B1 * | 2/2002 | Ludden et al. | ............. | 455/456.5 |
| 6,351,757 B1 * | 2/2002 | Lange et al. | .................. | 708/290 |
| 6,421,678 B2 * | 7/2002 | Smiga et al. | .................. | 707/102 |
| 7,024,205 B1 * | 4/2006 | Hose | .......................... | 455/456.1 |
| 2001/0049638 A1 * | 12/2001 | Satoh | .............................. | 705/26 |

(Continued)

FOREIGN PATENT DOCUMENTS

WO WO 00/04730 A 1/2000
WO WO 03/003694 A 1/2003

OTHER PUBLICATIONS

Ling Liu, "Query routing in large-scale digital library systems", Data Engineering, 1999 Proceedings, 15th International Conference on Sydney, NSW, Australia, IEEE Computer Society, pp. 154-163, Mar. 23-26, 1999.

*Primary Examiner* — Jeffrey Pwu
*Assistant Examiner* — Sulaiman Nooristany
(74) *Attorney, Agent, or Firm* — Cozen O'Connor

(57) ABSTRACT

A mediation unit (2, 3, 4, 5) in a telecommunications network for mediating between an application service provider (1) and a plurality of service providers (6), said unit (2, 3, 4, 5) comprising recovery means (2, 3) for recovering data concerning users from various service providers (6) and acquiring indications qualifying a user and qualifying one or types of data required on that user, such indications being issued by the application service provider (1), which mediation unit is characterized in that it comprises means (4, 5) for identifying a selection of service providers (6) containing the type of data required by the user, the recovery means (2, 3) further taking account of this selection so as to interrogate only service providers (6) selected in this way.

7 Claims, 2 Drawing Sheets

U.S. PATENT DOCUMENTS

| | | |
|---|---|---|
| 2002/0116234 A1* | 8/2002 | Nagasawa ............... 705/5 |
| 2002/0143664 A1* | 10/2002 | Webb ..................... 705/27 |
| 2003/0040280 A1 | 2/2003 | Koskelainen |
| 2003/0083988 A1* | 5/2003 | Reith ..................... 705/40 |
| 2003/0131073 A1* | 7/2003 | Lucovsky et al. ........ 709/219 |
| 2004/0128344 A1* | 7/2004 | Trossen .................. 709/203 |
| 2006/0168144 A1* | 7/2006 | Segan et al. ............ 709/219 |
| 2006/0195597 A1* | 8/2006 | Shaked et al. .......... 709/229 |

\* cited by examiner

MULTI-SUPPLIER, MULTI-DOMAIN MEDIATING ELEMENT FOR EVENT NOTIFICATION

RELATED APPLICATIONS

This is a U.S. National Phase Application under 35 USC 371 of International Application PCT/FR2004/000434, filed on 26 Feb. 2004.

FIELD OF THE INVENTION

The field of the invention is telecommunications. To be more precise, the invention facilitates access to dynamic data (linked to a user session) that concerns all types of users of services, that data some service providers may need to store and that other service providers may need to consult. The expression "service provider" refers to network service providers, also known as resource providers, and application service providers. Application service providers are so called because they are physical or functional units that process data that they receive in order to supply expressly processed data to an end user.

The function of resource providers, also known as network service providers, is to support and assist the transmission and transportation of data in the network.

The invention relates more precisely to a type of provider, known as a mediation service provider or generic service provider, that is operative between the usual providers and offers its services to other service providers.

BACKGROUND OF THE INVENTION

At the present time, the telecommunications services offered to consumers are diversifying and the number of service providers that provide them is increasing. The service providers are as varied as the types of service, from support network services such as collection services to application services such as video on demand (VoD) services, for example. A division has arisen between network service providers and providers of application services accessible via those networks.

Each service provider manages information on its own clients. Some information or data is "static" in that its value is fixed at the time of subscribing to or modifying the service; other information is "dynamic" in that it has a value, or even exists, only during a session using the service (e.g. a network access address). Of this dynamic information, some information is more dynamic than other information and may change during the same session (e.g. the user location). Some applications need to take account of information that sometimes relates to different services offered by any service providers, which are sometimes different from the provider that provides said application.

Examples that may be mentioned include the provision of global user location-information, potentially via all access networks to all operators, and the provision of user presence information, potentially on all access networks.

For the above reasons, a new type of provider that is operative between network service providers and/or application service providers has recently come into being: these mediation service providers, which are also known as generic service providers, offer telecommunications services.

The invention stems from the concern to enable a generic service provider, also known as a mediation service provider, to recover dynamic information easily and efficiently from service providers and to notify the corresponding events to other service providers that subscribe to this kind of multidomain multiprovider mediation. The term "multidomain" is used when the service providers that subscribe to the notification service do not all belong to the same commercial entity, for example the same telephone operator. Setting up this system gives additional added value to the mediation service provider.

At present there are two types of system for recovery by an application of user information stored by other services.

In a first type of system, the demanding application and the services holding the information are offered by the same service provider. In this case, the application is of less complex design because the various equipments and interfaces for obtaining the information are known. In some cases, the application may even need to interface only with one unit pooling information for all the services of the same service provider. However, information notification is not always supported directly.

In a second type of system, the enquiring application is supported by a service provider and the services holding the useful information are supported by other service providers unknown to the first. In this situation, one solution is to use the services of a user profile provider able to pool information linked to services supported by multiple providers. However, not all the required information is necessarily held by the profile provider and, more importantly, it is necessary to "retrieve" the information, as there is no associated notification service.

The above systems have the following disadvantages.

If the system is limited to recovering information from only one or a few given service providers, it has access only to information on a subset of services potentially accessible by a user.

If access to information on potentially all service providers is available via a single user profile provider, the application must retrieve the wanted information itself. Because of the very large volume of data concerned, it is typically necessary to use a polling system that is unwieldy and in some cases unsuitable.

Generally speaking, the application is often faced with a complex design resulting from the distributed nature of the units to be accessed and the heterogeneous nature or the absence of interfaces to be supported.

SUMMARY OF THE INVENTION

The objective of the present invention is to provide an efficient system that is easy to use to recover information available from any service provider in order to notify that information to other service providers that have requested it.

According to the invention, the above objective is achieved by a mediation unit in a telecommunications network for mediating between an application service provider and a plurality of service providers, said unit comprising recovery means for recovering data concerning users from various service providers and acquiring indications qualifying a user and qualifying one or more types of data required on that user, such indications being issued by the application service provider, which mediation unit is characterized in that it comprises means for identifying a selection of service providers containing the type of data required by the user and the recovery means also take account of this selection so as to interrogate only service providers selected in this way.

As a result, a mediation service provider supporting the above type of system can offer a global information notification service to application service providers.

It can rely on the above type of system to offer service providers simple generic services including in particular complete coverage of potentially accessible service providers.

BRIEF DESCRIPTION OF THE DRAWINGS

Other features, objectives and advantages of the invention will become apparent on reading the following detailed description, which is given with reference to the appended drawings, in which.

DETAILED DESCRIPTION OF THE DRAWINGS

The present example relates to a multidomain multiprovider mediation server for notifying events to telecommunications service providers and is based on a system comprising a recovery and notification server 3 with an associated local database 2 and a server 4 for providing information on a user on the service providers of that user (also called "user information server") that is associated with a local database 5.

The database 5 associates each user with all service providers holding information on that user.

Figure 1:
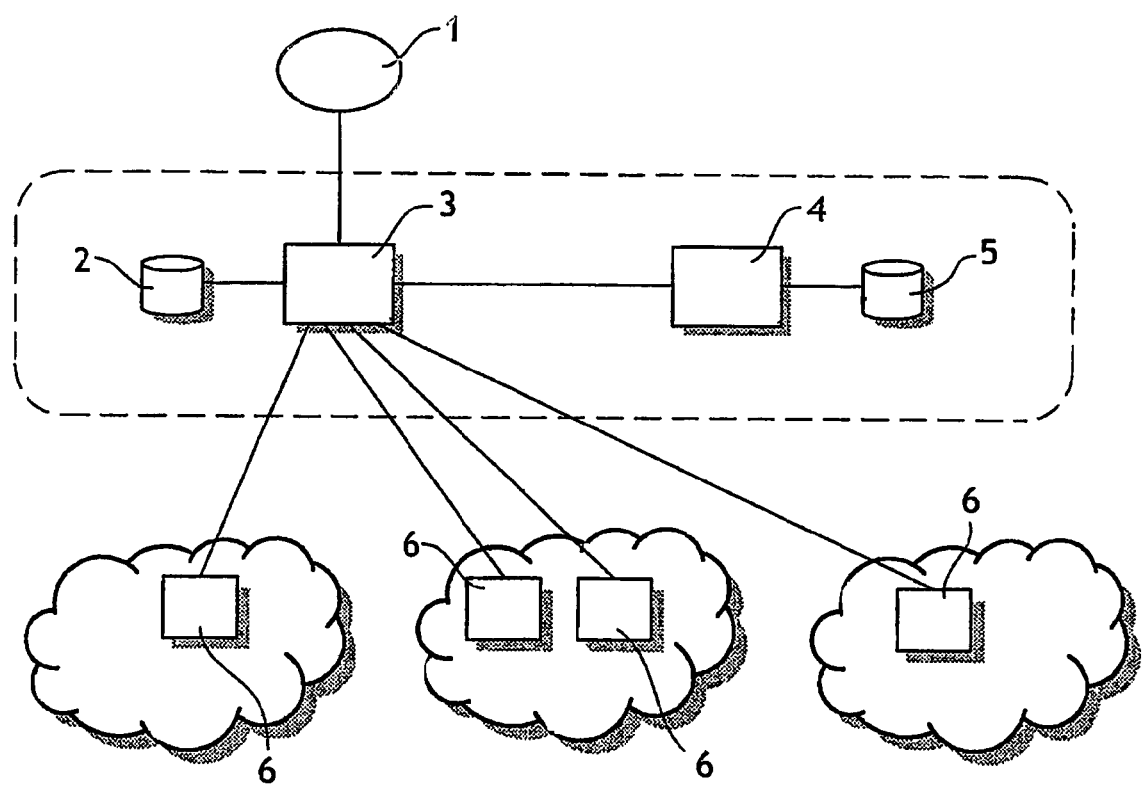
FIG. 1 is a diagram of the elements of a preferred embodiment of the invention, shown in their technical environment.

Accordingly, in FIG. 1, the element 1 represents an application that is provided by an application service provider and is requesting external information and the element 2 represents a database that is local to the recovery and notification server 3.

The element 3 represents a recovery and notification server of a mediation service provider (this refers to a function rather than an entity).

The element 4 represents a "user information server" as defined above.

The element 5 represents a database local to the "user information server" 4. In the present example the database 5 is different from the database 2.

The element 6 represents an information server entity for a service or a set of services, which may or may not support notification.

Note that this service provider 6 can be an application service provider or a network service provider, also known as a resource provider.

Figure 2:
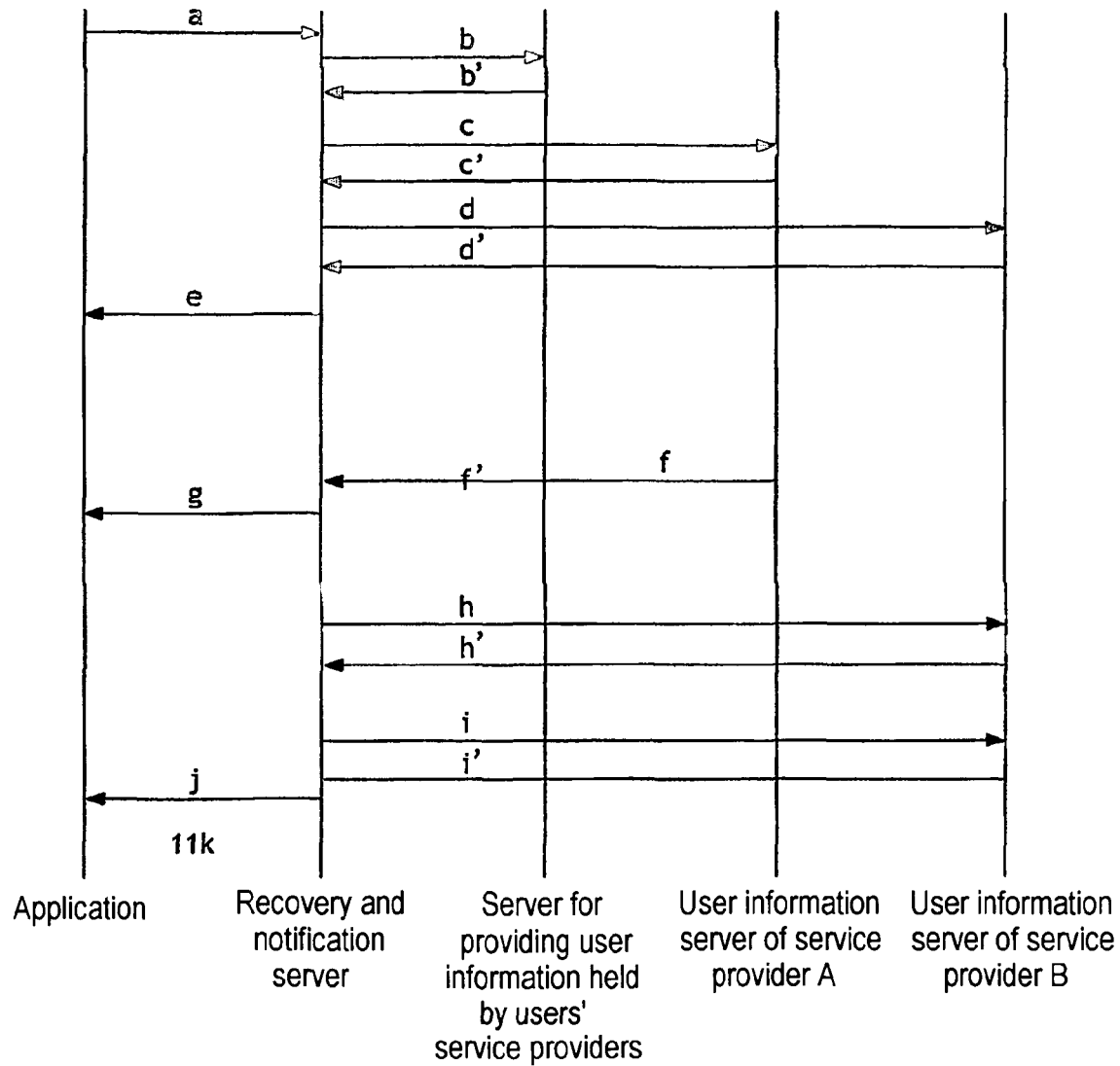
FIG. 2 is a diagram showing the streams exchanged in that embodiment of the invention.

FIG. 2 shows an example of the interactions between the main elements of the invention and surrounding elements.

In a step a) the application 1 provided by the application service provider subscribes to a notification service offered by the recovery and notification server 3 in respect of a given user and given information; the subscription mechanism is not described here. It provides in particular a user identification, a description of the required information, and the identification of the provider of information on a user held by the service providers of that user.

The required information is described in a description language that is sufficiently general to cover all types of information that an application might require.

The recovery and notification server does not need to be uniquely associated with a server providing information on a user held by the service providers of that user. This server should preferably support the interface recommended in the present example.

In a step b), the recovery and notification server 3 contacts the server 4 providing information on a user on the service providers of that user in order to obtain a list of providers 6 of services to the user holding information required by the application 1. That list is obtained from the association between the user and his service providers stored by the "user information server" 4.

The present example does not include the aspect of authorization by the user of access to information concerning him, but this is an advantageous functional add-on to the functions of the element 4. The specific protocol used between the two servers is not described in detail.

For example, b') constitutes a response containing a list of providers of services to the user corresponding to the request.

In the present example, two providers A and B of services to the user hold information requested by the application.

In a step c), the recovery and notification server contacts the provider A of services to the user in order to subscribe to the recovery of the required information, which is described in a description language that is sufficiently general to cover all types of information that a server may require. The specific protocol used between the two entities is not described in detail. For example, c') constitutes a successful subscription response.

In a step d), the same interactions as in step c) take place, but in respect of the provider B of services to the user.

In a step e), the recovery and notification server 3 indicates to the application that the subscription has been accepted and is operational. There are other messages to indicate refusal of subscription (no authorization, missing information, etc.).

In a step f), information to which the recovery and notification server 3 has subscribed changes. Assuming that the protocol between the provider A of services to the user and the user supports notifications, the server 3 is notified of this event.

In a step g), the recovery and notification server 3 notifies the application 1 provided by the application service provider, specifying the information that has changed, in accordance with the subscription of the application held in the local database 2; the application can then initiate processing appropriate to this event. Other information associated with the information that has changed may also be reported. For example, if the event to which the information relates is connection to a network, the identification of the user in that network can be reported.

In a step h), because the protocol between the provider B of services to the user and the recovery and notification server 3 does not support notifications, the server 3 regularly enquires if specified information has changed; the step h' is a negative response to a change enquiry.

In a step i), the server regularly enquires if specified information has changed; it is assumed that the step i') is a positive response to a change enquiry.

In a step j), the recovery and notification server 3 notifies the application of the information that has changed, in accordance with the subscription of the application, which can then initiate processing appropriate to this event. Other information associated with the information that has changed can also be reported. For example, if the event notified by the information is connection to a network, the identification of the user in that network can be reported.

The functional content of the protocols is not described in detail in the present example, but other functions can of course be included, such as terminating or modifying the application's subscription.

The recovery and notification server 3 supports the single interface with applications and manages the subscriptions of applications which it holds in its local database 2, as well as managing the modification of subscriptions and the dismissal of application service providers that are clients of the mediation service provider. The required information is described in a description language that is sufficiently general to cover all types of information that an application may require. It notifies the application 1 of events relating to the information subscribed to.

The server 3 supports an interface with the server providing information on a user held by the service providers of that user. This interface in particular enables it to recover a list of service providers liable to hold information corresponding to the subscriptions of applications, with a description of that information. It must also be able to verify that the applications are authorized to report user information.

The server interfaces with the service providers 6 holding information relating to one or more users. It describes the information it requires in a description language that is sufficiently general to cover all types of information. It supports various types of protocols, some of which support the reporting of notifications and others of which do not. If a service provider 6 does not support notifications, the recovery server 3 uses the appropriate procedure to recover the information in the fastest and most efficient manner possible.

The server 4 providing information on a user held by the service providers of that user supports an interface with the recovery and notification server. Its local database 5 stores the associations between users that it manages and service providers 6 liable to hold information on those users (how these associations may be established is not described here), and can also store authorizations to access user information.

Subscriptions to the recovery and notification server 3 can also be stored in the local database 2. Warning of a modification to the list of information providers 6 for a given user or to information stored by a given provider can therefore also be given.

The invention claimed is:

1. A mediation unit in a telecommunications network for mediating between an application service provider and a plurality of service providers, said unit comprising:
   recovery means for acquiring user indicators qualifying a user of an application provided by an application server and qualifying a type of data required on that user, the indicators being issued by said application service provider and providing an identification of the user, the recovery means being further for recovering data of said type concerning said user from various service providers; and
   means for identifying among the various service providers a selection of service providers holding data of said type of data required on the user, the recovery means taking into account said selection of service providers such that only the selected service providers are interrogated;
   wherein the recovery means include a subscriptions database that contains user indicators identifying users of the application associated with indicators describing types of data required by the application service provider on each user of the application;
   wherein the means for identifying the selection of service providers is associated with a second database comprising associations between each specific user managed by the means for identifying and service providers having information on said specific user, the selection being obtained from an association in said second database;
   wherein the recovery means are configured to acquire data from the selected service provider by setting up a notification link between the selected service provider and the recovery means by which the selected service provider provides a notification of data to the recovery means based on an initiative of the selected service provider; and
   wherein the selected service provider provides a notification of specific data to the recovery means in response to a modification of said specific data.

2. The mediation unit according to claim 1, wherein said means for identifying a selection of service provider identify service providers that simultaneously hold data of said type of data required and that act for said client.

3. The mediation unit according to claim 1, wherein the recovery means provide a notification of recovered data to the application service provider based on an initiative of the recovery means.

4. The mediation unit according to claim 1, wherein the recovery means are configured to advise the application service provider that a data recovery link to the selected service providers has been set up.

5. The mediation unit according to claim 1, wherein the recovery means are configured to support a recovery link with a service provider in which the service provider is an initiator for providing notifying data to the recovery means and the recovery means support a recovery link in which the recovery means initiates requests of information from the service provider.

6. The mediation unit according to claim 1, wherein the recovery means include means authorizing modification on request of the types of data on a given user designated in the subscription data base as required by the application service provider.

7. A mediation unit in a telecommunications network for mediating between an application service provider and a plurality of service providers, said unit comprising:
   recovery means for acquiring user indicators qualifying a user of an application provided by an application service provider and qualifying a type of data required on that user, the indicators being issued by the application service provider and providing an identification of the user, the recovery means being further for recovering data of said type concerning said user from various service providers; and
   means for identifying among the various service providers a selection of service providers holding data of said type of data required on the user, the recovery means taking into account selection of service providers such that only the selected service providers are interrogated;
   wherein the recovery means include a subscriptions database that contains user indicators identifying users of the application associated with indicators describing types of data required by the application service provider on each user of the application;
   wherein the means for identifying the selection of service providers is associated with a second database comprising associations between each specific user managed by the means for identifying and service providers having information on said specific user;
   wherein the recovery means are configured to support a recovery link with a selected service provider in which the selected service provider is an initiator for providing notifying data to the recovery means and the recovery means support a recovery link with a selected service provider in which the recovery means initiate requests of data from the selected service provider; and
   wherein the mediation unit performs queries at regular intervals to determine whether specified information has changed.

\* \* \* \* \*